United States Patent Office 3,479,732
Patented Nov. 25, 1969

3,479,732
MANUFACTURE OF COMPOSITE
THERMOSTATIC METAL
Jacob L. Ornstein, Attleboro, and Howard C. Mueller, Norwood, Mass., assignors to Texas Instruments Incorporated, Dallas, Tex., a corporation of Delaware
Filed Sept. 1, 1966, Ser. No. 576,631
Int. Cl. B23k *31/02*
U.S. Cl. 29—497.5         4 Claims

ABSTRACT OF THE DISCLOSURE

A bonded composite is prepared of at least two metals, a first one having a relatively low coefficient of thermal expansion which is substantially a function of cold-working and a second one having a relatively high coefficient of thermal expansion which is substantially independent of cold-working. A first thickness of the prepared composite is selected which is in excess of the desired final gauge thickness, and at this excess thickness the composite is annealed to a substantially dead-soft condition. Then it is reduced by rolling to said final gauge thickness, which involves cold-working. The amount of cold-working determines the coefficient of thermal expansion of said first metal with concomitant determination of the flexivity of the composite at the final gauge. There exists a relationship between the ranges of reductions and resulting flexivity of any two such metals selected to form the composite. The required reduction determines the increment that the first thickness must exceed the final gauge. Thus for any arbitrarily selected final gauge, any of a range of flexivities can be obtained by properly selecting the increment at which annealing is to be performed. Then rolling to the finished gauge will cancel the increment and involve the proper amount of cold-working needed.

---

This invention relates to the manufacture of composite thermostatic metal, said metal being useful in the construction of thermostats.

Among the several objects of the invention may be noted the provision of a method of manufacture of composite or multilayer thermostatic materials, whereby such materials may be expeditiously manufactured according to a variety of desired flexivities. Other objects and features will be in part apparent and in part pointed out hereinafter.

The invention accordingly comprises the methods hereinafter described, the scope of the invention being indicated in the following claims.

Figure 1:
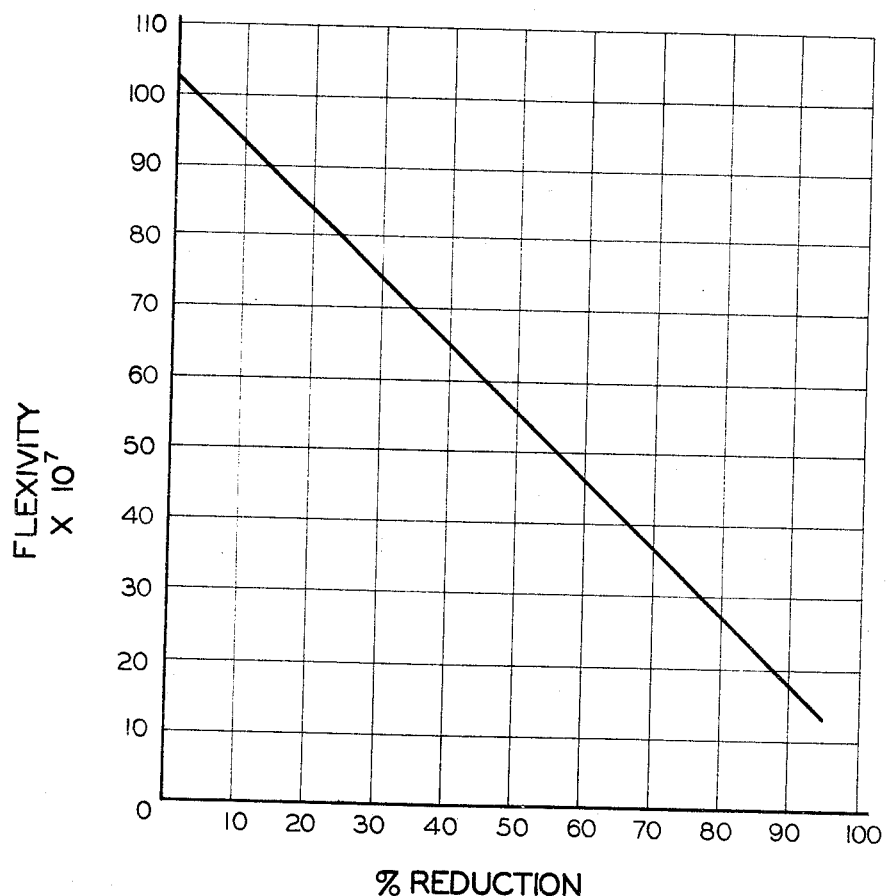
Figure 2:
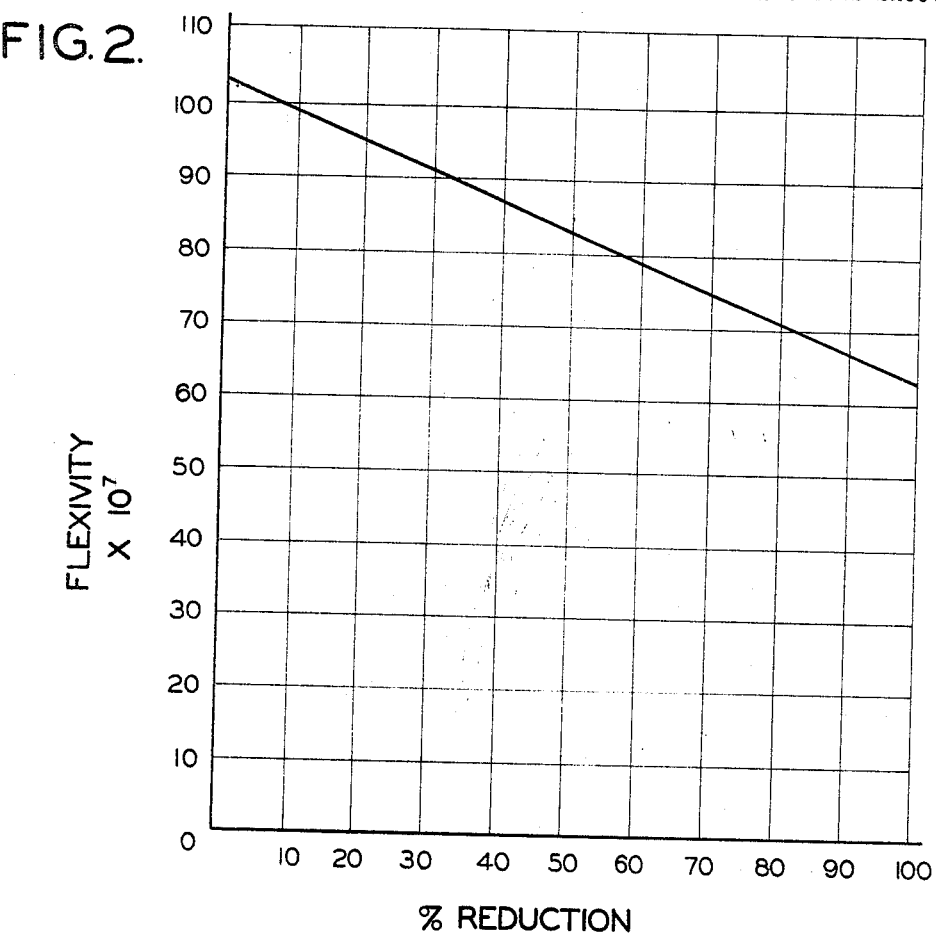
Figure 3:
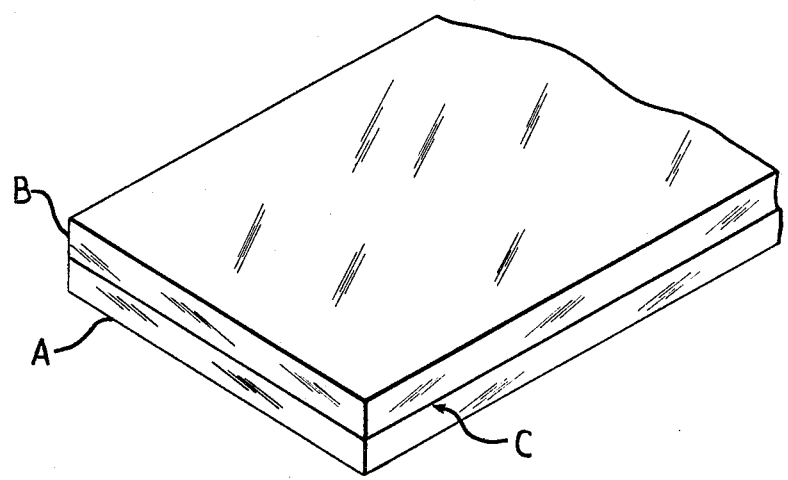

In the accompanying drawings, in which several of various possible embodiments of the invention are illustrated, FIGS. 1 and 2 are nonstatistical and illustrative graphs illustrating the decrease in flexivity with increased reduction of certain composite thermostatic materials constructed according to the invention; and FIG. 3 is a perspective view illustrating one form of such materials.

Alloys are to be considered herein as species of metal, the terms alloy and metal being used synonymously. The construction and operation of composite or multilayer thermostatic metals is predicated upon the fact that metals of different thermal coefficients of expansion, when interfacially bonded together, will deform or flex when subjected to temperature change. A measure of the deflection of a multilayer material is called its flexivity. Flexivity is defined as a change in curvature of a multilayer composite material per unit of temperature change per unit of thickness of the composite. This flexivity depends upon the difference in the thermal coefficients of expansion (sometimes referred to as the expansivity) of the bonded layers. Most of the metals used in the manufacture of conventional multilayer thermostatic metals have expansivity, i.e., thermal coefficients of expansion, the values of which are substantially independent of the treatments through which the metals pass in the manufacturing process, such as by rolling for bonding and sizing, forming, et cetera. For example, U.S. Patent 2,691,815 describes a bonding method involving such treatments. These involve cold-working, annealing and sizing steps. Most of the alloys used in the manufacture of common thermostatic metal composites have expansivities, i.e., thermal coefficients of expansion, which are substantially independent of the cold-working performed thereon.

Heretofore, in order to vary the flexivity of the usual multilayer composite used, it was the practice during manufacture to alter the ratio of the thicknesses of the component layers to change the operating temperature range of operation to which the composite material would be subjected when incorporated in a thermostat. We have discovered that an alloy may be used for one of the component layers which exhibits the unique characteristics of a change in expansivity or thermal coefficient of expansion as a function of the amount of the cold-working performed thereon and retained therein. Thus to obtain a desired flexivity or thermal activity for a desired composite, we arrange for an amount of cold-working to be accomplished and retained in the alloy to bring about any desired one of various flexivities in a substantial range of the same when the alloy is incorporated as part of a composite. Hence any one of various flexivities at a given operating temperature may be obtained for a given thickness of a thermostatic composite or given thicknesses of its components.

We have found that an alloy of nominal composition in approximate percentages by weight of Co 57, Cr 9 and the balance Fe, exhibits the peculiar characteristic which consists in a change in expansivity as the function of the amount of the cold-working performed thereon. This alloy in the cold-worked state is used as a component layer of low expansivity in the multilayer thermostat material made according to the invention. The other layer of higher expansivity does not exhibit a change in expansivity as a function of the amount of cold-working, as for example conventional 304 stainless steel or silicon bronze. Silicon bronze consists in approximate percentage by weight of SI 1½ and the balance copper. Two layers of high and low coefficients such as above described are often joined by solid-phase bonding brought about by squeeze-rolling. During rolling a reduction occurs in the thicknesses of the components which effects a green bond. To increase the bond, annealing is used. The composite is then usually dead soft. It should be noted that other methods of bonding can be employed. After bonding, the composite is rolled down to the desired thickness, which again involves cold-working. It is the latter cold-working that we control during sizing in order to control the flexivity of the final composite. Thus as to the alloy Co 57, Cr 9, balance Fe, to obtain a desired or selected flexivity of a finished multilayer thermostatic material having said alloy as the low-expansion component we arrange for cold-working that component so that it has an expansivity which will produce in the finished thermostatic material the flexivity required.

In FIG. 1 is an illustrative graph of the change in flexivity of a composite with increase in reduction during rolling. The composite is a solid-phase bonded and sized multilayer thermostat material composed of the alloy (Co 57, Cr 9, balance Fe) for the low-expansion component (hereinafter referred to as forming a layer A), and of 304 stainless steel for the high-expansion component (hereinafter referred to as forming a layer B). Layers A and B are illustrated in FIG. 3 as having been green-bonded in the solid-phase over their clean interfacial area C by rolling them together with reduction in thickness and appropriate heating to improve the green bond. Thereafter further reduction to a desired thickness of the composite is carried out with cold-working in amount to bring about the flexivity desired in the final composite. The result is a bimetal thermostatic material as shown in FIG. 3.

As above stated, the high-expansion layer B may be another metal than stainless steel, as for example but without limitation, the above-mentioned silicon bronze. FIG. 2 is a graph of the change in flexivity of the resulting composite with increase in reduction during rolling, for producing a solid-phase bonded multilayer thermostat material, as shown in FIG. 3, composed of the alloy (Co 57, Cr 9, balance Fe) for the low-expansion component A and silicon bronze for the high-expansion component B.

The invention is not limited to the product of two-layer thermostatic materials and three-layer thermostatic materials may be made according to the invention herein. Thus as is known, a shunt layer of a third metal may be included between layers A, B. Additional cladding layers on the outside of the layers A and B may also be employed within the scope of the invention for such function as corrosion resistance.

It will be understood that metallurgical bonding over the interface C may be accomplished otherwise than by solid-phase bonding but in such event the low-expansion layer A, composed of Co 57, Cr 9 and the balance Fe. must nevertheless be sufficiently cold-worked during sizing to provide the amount of flexivity desired in the multilayer composite product.

It should be understood that it is an advantage in quantity production of a thermostatic material to produce it in a given thickness, or at least a limited number of thicknesses. Therefore it is desirable not to have the thickness dictated by each and every desired flexivity called for. Thus production of a composite thermostatic metal in quantities designed to meet a particular specification as to any one of a range of flexivities can be accomplished by using any desired thickness of the composite and/or ratio of thicknesses of the component layers of the finished thermostatic material. By appropriate cold-working of the low-expansion layer composed of Co 57, Cr 9 and the balance Fe, or an equivalent, the desired flexivity of the composite is obtained.

A specific example for carrying out the invention is as follows: Assume that one wishes to produce a bonded material containing as a high expansion side 304 stainless steel and as a low expansion side the cobalt, chromium, iron aloy above described. Final thickness desired is 0.010 inches but it is desired that a portion of the material have a flexivity of $103 \times 10^7$ and that a second portion have a flexivity of $56 \times 10^7$. Referring to the chart of FIG. 1 one notes that a final reduction of 0% will produce an average flexivity of about $103 \times 10^7$ and a final reduction of 50% will produce an average of about $56 \times 10^7$. Reduction is commonly defined in metal rolling practices as $$\left( \frac{(t_1 - t_2)}{t_1} \times 100\% \right)$$

where $t_1$ is defined as thickness in the "dead soft" or fully annealed state prior to cold rolling and where $t_2$ is the thickness after cold rolling.

From the above it will be seen that to produce a flexivity of $103 \times 10^7$, one would follow a standard sequence of bonding, annealing and rolling steps to reduce the bonded material to 0.010 inches thick. At this point the material would be completely annealed to cause $t_2$ to equal $t_1$ thereby causing the final reduction to be 0%. To produce a flexivity of $56 \times 10^7$, one would follow the same sequence as above down to 0.020 inch thick. At 0.020 one would fully anneal the material and then cold roll to 0.010 inch thick as the last manufacturing operation. In this case, $t_1$ is 0.020 inch and $t_2$ is 0.010 inch causing the final reduction to be 50%.

Similarly, assume that one choses a bonded material containing as a high-expansion side silicon bronze and as a low-expansion side the same cobalt, chromium, iron alloy previously described. Final thickness desired is again 0.010 inch but the desired flexivities are $103 \times 10^7$ and $84 \times 10^7$. Referring to the chart of FIG. 2 one notes that average flexivities of about $103 \times 10^7$ and about $84 \times 10^7$ can be produced by final reductions of 0% and 50%, respectively. Since these reductions and the final thickness are exactly the same as in the preceding case, the same sequence of operations as previously described would be applied to this case.

It will be understood that the examples above given are merely illustrative and that the invention is not limited to the above described materials, thicknesses or final reductions. Thus, knowing the relationship of flexivity to reduction, which can be determined by empirical engineering studies as illustrated in FIGS. 1 and 2, then the generation of any flexivity, within the range of those flexivities existing between 0% and 99.99+% final reduction, is possible by selecting the correct reduction as previously described and altering the manufacturing process to produce that reduction.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of manufacturing a bonded composite thermostatic material having a required flexivity at a required finished gauge, comprising,
   interfacially contacting first and second metal layers, the first layer of which is composed of a metal having a comparatively low coefficient of expansion which is substantially a function of cold working thereof by reduction, and the second layer of which is composed of a metal having a relatively high coefficient of thermal expansion which is substantially independent of cold working thereof by reduction,
   selecting an increment to produce through its elimination by rolling an amount of cold working of the first layer of metal to produce a thermal coefficient of expansion thereof which with the thermal coefficient of expansion of the second layer will produce the required flexivity of the composite at the finished gauge,
   bonding the layers to form a composite at an initial gauge of the composite which exceeds that of the finished gauge by said selected increment, annealing the composite to a substantially dead-soft condition at said initial gauge, and eliminating said increment by rolling the dead-soft composite from said initial gauge down to the required finished gauge.

2. The method according to claim 1, wherein the first layer of metal is an alloy consisting substantially of 57% Co, 9% Cr, the balance Fe.

3. The method according to claim 2, wherein the second layer of metal is silicon bronze.

4. The method according to claim 2, wherein the second layer of metal is stainless steel.

References Cited
UNITED STATES PATENTS

| | | | |
|---|---|---|---|
| 2,770,870 | 11/1956 | Mooradian | 29—195.5 |
| 3,102,793 | 9/1963 | Alban | 29—195.5 |
| 3,219,423 | 11/1965 | Sears et al. | 29—195.5 XR |
| 3,284,174 | 11/1966 | Zimmer | 29—195.5 XR |

R. B. LAZARUS, Assistant Examiner

JOHN F. CAMPBELL, Primary Examiner

U.S. Cl. X.R.

29—195.5, 498